July 23, 1968 O. M. JOHNSON 3,394,039

MACHINE

Filed June 15, 1965 3 Sheets-Sheet 1

INVENTOR
ORVILLE M. JOHNSON
BY
Carpenter, Kinney & Coulter
ATTORNEY.

July 23, 1968 O. M. JOHNSON 3,394,039

MACHINE

Filed June 15, 1965 3 Sheets-Sheet 2

INVENTOR
ORVILLE M. JOHNSON
BY Carpenter, Kinney & Coulter
ATTORNEYS

MACHINE

Filed June 15, 1965

INVENTOR
ORVILLE M. JOHNSON
BY Carpenter, Kinney & Coulter
ATTORNEYS 3,394,039

MACHINE

Orville M. Johnson, Roseville, Minn., assignor to Minnesota Mining and Manufacturing Company, St. Paul, Minn., a corporation of Delaware Filed June 15, 1965, Ser. No. 464,068
6 Claims. (Cl. 156—468)

ABSTRACT OF THE DISCLOSURE

A machine of the present invention contains a tape needle for guiding adhesive tape through a narrow opening adjacent to an article to which the tape is to be attached and a buffer for movement against the back non-adhesive side of the tape and through the tape needle in order to adhere the adhesive side of the tape to the article.

The present invention relates to a machine for attaching adhesive tape to an article. A machine of the present invention includes a tape needle for guiding adhesive tape through a narrow opening adjacent to an article to which tape is to be attached and a buffer for movement against the back, non-adhesive side of the tape and through the tape needle in order to adhere the adhesive side of the tape to the article.

The embodiment of the present invention which is shown in the attached drawings was constructed for the purpose of applying electrical adhesive tape to the end-turn windings of stators for small electric motors, and that machine includes the use of a tape needle and buffer of the present invention for controlling the tape and extending it through the narrow opening between the windings and the stator stack in the process of applying a wrapping of adhesive tape around the windings. Machines employing two such tape needles have been constructed which apply tape to two windings simultaneously, and such machines have been able to apply adhesive tape to the windings of the small motors at the rate of up to 500 in one hour.

A machine containing a tape needle and a buffer of the present invention has an advantage in use for applying tape to an article through a narrow opening. The tape needle itself is preferably a flat piece containing means for guiding tape along it and having a cut-out portion through which the buffer can be moved against the back non-adhesive side of the tape after the needle has been moved through the narrow opening. Such movement of the buffer acts to move the tape out of the guiding means and against the surface of the article, causing the adhesive side of the tape to become adhered to the article. The tape needle can then be moved back out of the narrow opening and around the article to cause additional quantities of tape to become adhered to the article.

The other objects and advantages of a machine of this invention will be apparent from the following detailed description of the embodiment shown in the accompanying drawings, in which drawings.

Figure 6:
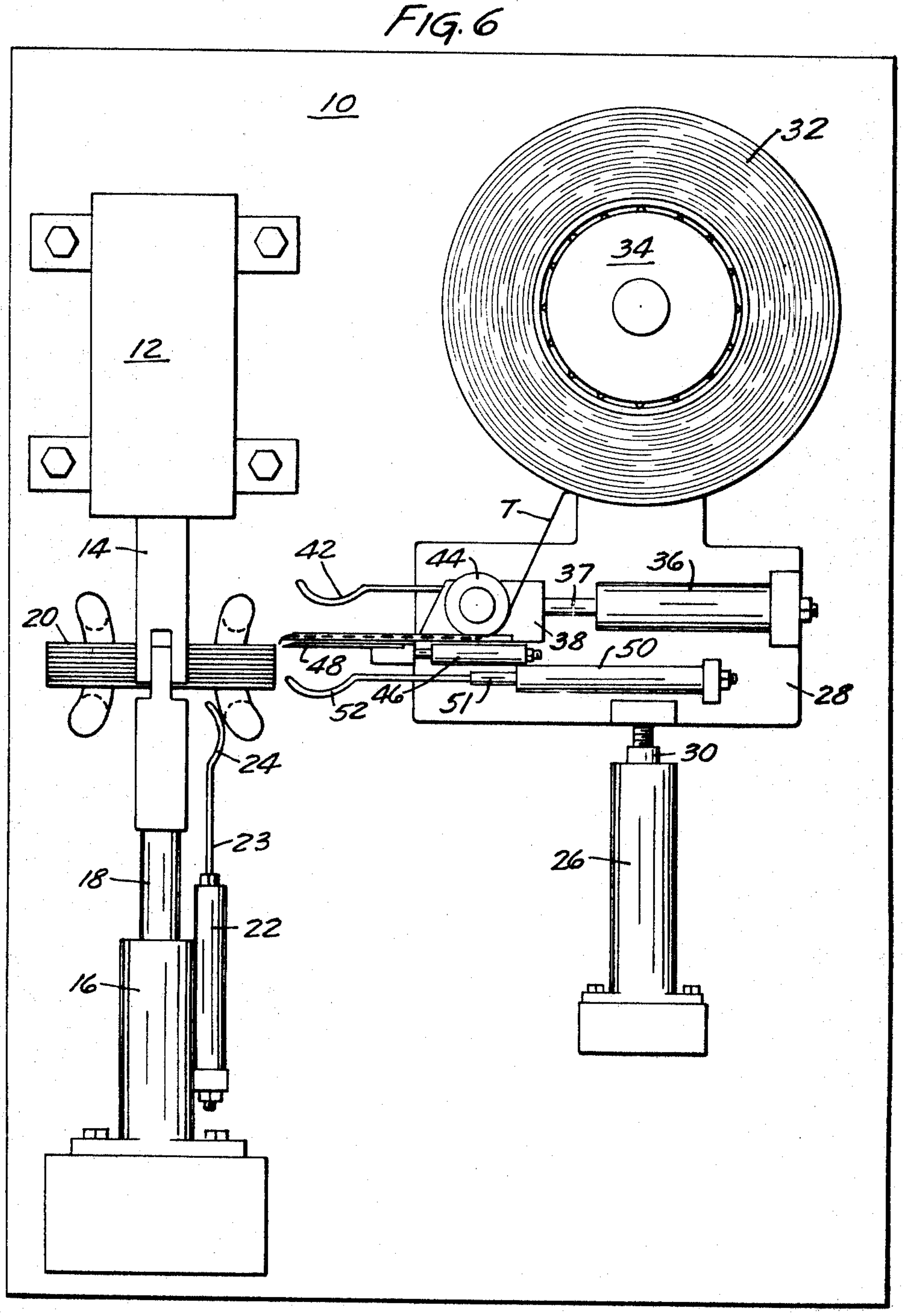
FIGURE 6 is a plan view of a machine of the present invention, with the tape threaded therein and showing the parts thereof in rest position, with a stator held in place on the machine, ready for the attachement of tape around one of the end-turn windings.

Referring first to FIGURE 6, the parts of the machine are attached to a support plate 10. A stator holder 12 is attached to support plate 10, and a holding fixture 14 extends outwardly from stator holder 12. An air cylinder 16 is attached to support plate 10, and a cylinder rod 18 extends outwardly from air cylinder 16 and toward holding fixture 14. The stator 20 is held in position on holding fixture 14 by the movement of cylinder rod 18 in air cylinder 16. An air cylinder 22 is attached to the air cylinder 16, and a buffing arm 24 is formed at the end of the cylinder rod 23 which extends from the air cylinder 22.

An air cylinder 26 is attached to support plate 10, and a tape deck 28 is affixed to the cylinder rod 30 which extends from the air cylinder 26. A roll of pressure-sensitive adhesive tape T is mounted upon a hub 34, and hub 34 is rotatably attached to tape deck 28. An air cylinder 36 is attached to tape deck 28, and a tape plate 38 is attached to the cylinder rod 37 of air cylinder 36. A tape needle 40 is attached to the tape plate 38, and a buffing arm 42 is also attached to tape plate 38. A roller 44 is attached to tape plate 38 in such manner that it is rotatable in only a clockwise direction, and is not rotatable in a counter-clockwise direction when viewed as shown in FIGURE 6. An air cylinder 46 is attached to tape deck 28, and a knife blade 48 is attached to the end of the rod from the air cylinder 46. An air cylinder 50 is attached to the tape deck 28 and a buffing arm 52 is formed at the end of the cylinder rod 51 which extends from the air cylinder 50.

Figure 1:
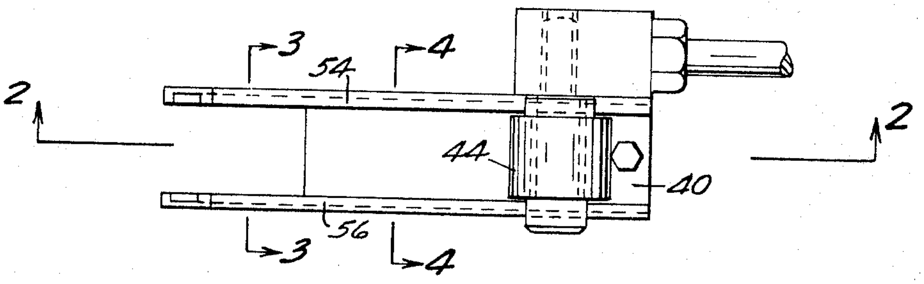
FIGURE 1 is an enlarged plan view of a tape needle after it has been removed from the machine shown in FIGURE 6 and after the tape has been removed from the tape needle.
Figure 2:
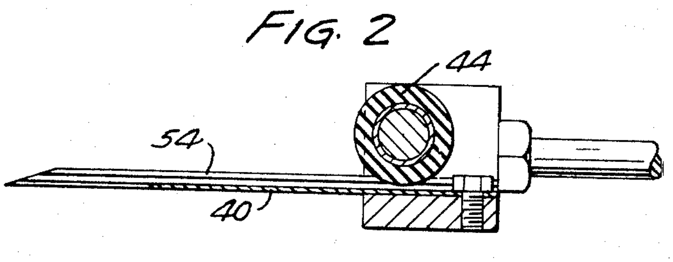
FIGURE 2 is a sectional view taken along the lines 2—2 of FIGURE 1.
Figure 3:
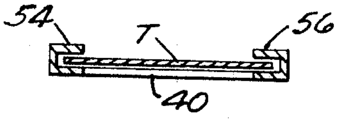
FIGURE 3 is a sectional view taken along the lines 3—3 of FIGURE 1 after the tape has been threaded into the tape needle.
Figure 4:
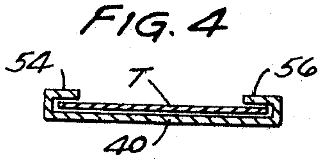
FIGURE 4 is a sectional view taken along the lines 4—4 of FIGURE 1 after the tape has been threaded into the tape needle.
Figure 5:
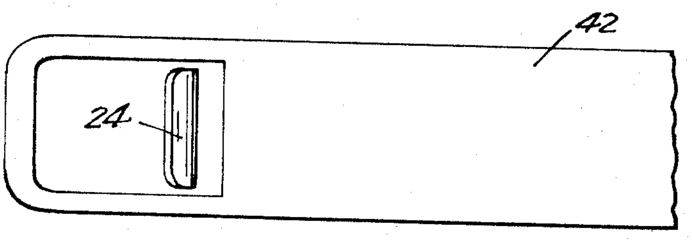
FIGURE 5 is an enlarged plan view showing the detailed construction of two of the buffers contained in the machine shown in FIGURE 6, showing an aperture which is contained in only one of the buffers and through which another buffer can pass in the manner shown in the drawing.

Referring now to the FIGURES 1 through 4, it will be seen that the tape needle 40 is formed from a thin piece and provided with guides 54 and 56 along each side thereof, and the one way roller 44 is positioned between said guide slots. The tape T which is unwound from the roll 32 is threaded so that the adhesive side of the tape contacts the surface of the roller 44, and the back non-adhesive side of the tape contacts the surface of tape needle 40, with both edges of the tape contained within the entire length of the guide slots 54 and 56. The tape needle 40 is formed with the guide slots 54 and 56 extending outwardly beyond the flat surface of the needle, as is shown most clearly in FIGURE 1, in order that the buffer 24 can be moved through that cut-out portion of the tape needle 40 during the operation of the machine. As is shown in FIGURE 5, the buffer 42 is provided with an aperture opening therein, and, during the operation of the machine, the buffer 24 is moved through that aperture, in the manner which is shown in FIGURE 7.

Compressed air, at a pressure of approximately 80 pounds per square inch, is supplied through solenoid operated air valves to the air cylinders which are shown in the drawings and described above. The source of compressed air and the valves which control the flow of the air are not shown in the drawings, nor are the switches, since those parts are well known and the switches can be attached directly to the machines or be controlled by a remote timer.

Figure 7:
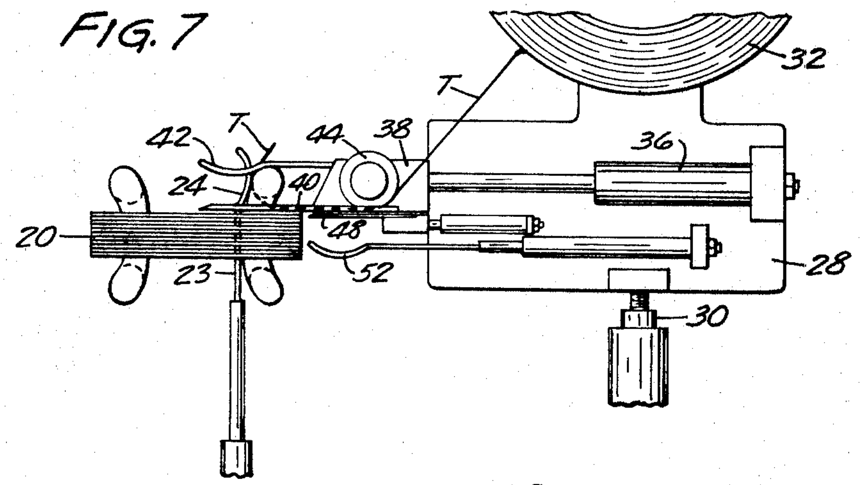
FIGURES 7, 8 and 9 are fragmentary views taken during the operation of the machine shown in FIGURE 6, and showing the progressive steps of the machine in applying tape around a winding of a stator.
Figures 8, 9:
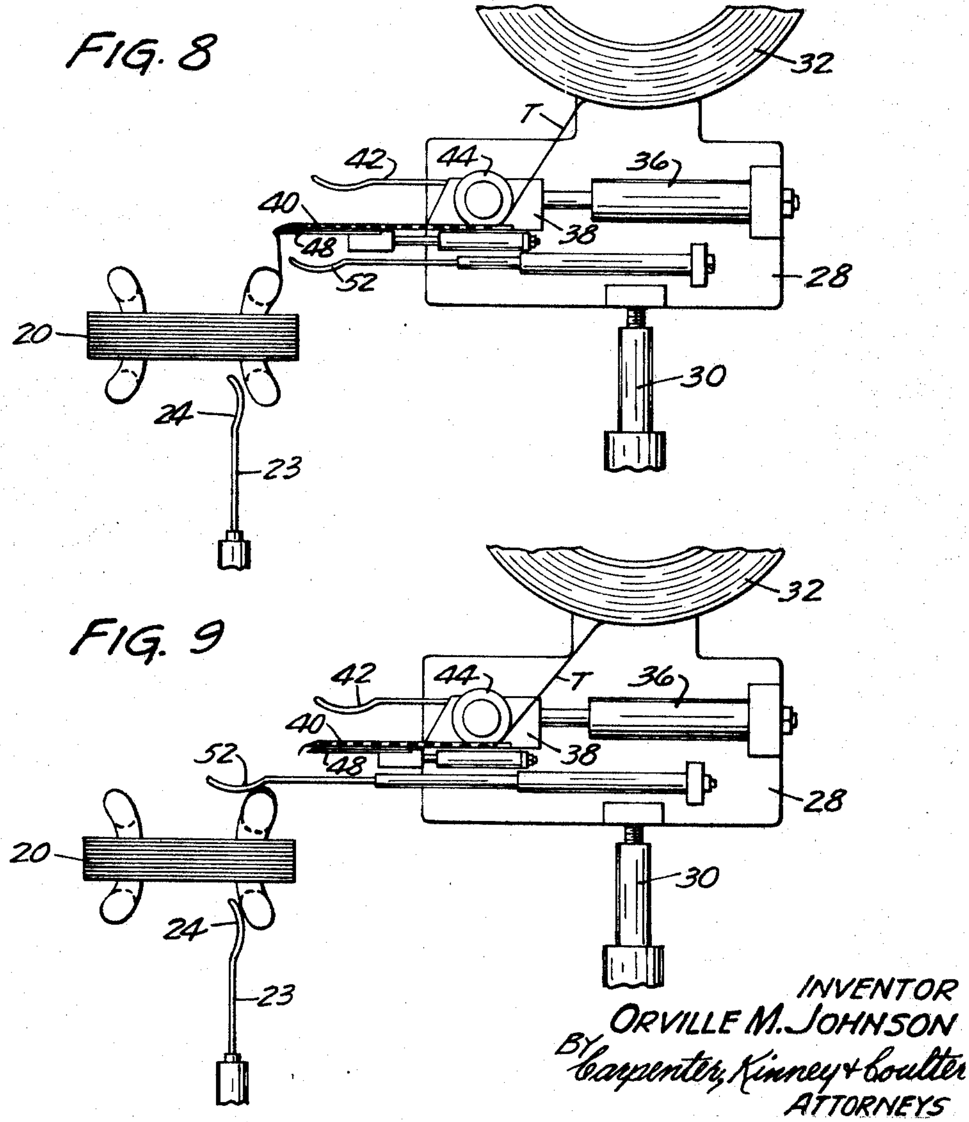

Referring now to the FIGURES 7, 8 and 9, the operation of the machine begins with the tape threaded as described above and as is shown in FIGURE 6. The operator of the machine places the stator on the holding fixture 14 and permits air to enter the drive side of the air cylinder 16 to cause the cylinder rod 18 to be moved toward holding fixture 14, to hold the stator on that fixture while one of the windings is wrapped with tape. Air is then permitted to enter the drive side of air cylinder 36, causing tape plate 38 to be moved toward stator 20, and tape needle 40 is moved between one of the windings and the stator stack. The buffing arm 42 is, at the same time, moved along the other side of the winding until the buffing arm 42 and tape needle 40 are in the position in which they are shown in FIGURE 7. Air is then permitted to enter the drive side of the air cylinder 22, and the buffer 24 is moved through stator 20 and tape needle 40 and through the aperture in buffing arm 42 in the manner which is shown in FIGURE 5, until those parts are in the position which is shown in FIGURE 7. Such movement of buffer 24 causes it to move against the back non-adhesive side of the tape and to move the tape out of the guide slots 54 and 56 and against the surface of the winding, and the free end of the tape T then protrudes through the aperture in buffing arm 42, as is shown in FIGURE 7.

Air is then permitted to enter the retract side of the air cylinder 22, and to be exhausted from the drive side of that cylinder, so that the buffer 24 is retracted from the aperture in buffing arm 42, tape needle 40 and stator 20. Thereafter, air is permitted to enter the retract side of the air cylinder 36 and exhausted from the drive side of that cylinder, thereby retracting tape plate 38 away from the stator 20 and causing tape T to be unwound from tape roll 32 by reason of the fact that the tape is adhered to the winding. At that same time, the buffing arm 42 causes the free end of the tape T to be adhered to the winding. Air is then permitted to enter the drive side of the air cylinder 26, causing tape deck 28 to be moved into the position which is shown in FIGURE 8, and that movement results in tape being wound around the side of the winding which is nearest to tape plate 38, as is shown in FIGURE 8.

Air is then permitted to enter the drive side of the air cylinder 46, causing knife blade 48 to contact the back of the tape T and sever the tape across the width thereof. Thereafter, air is permitted into the drive side of the air cylinder 50, causing buffer 52 to contact the back non-adhesive side of the tape which was severed from the tape roll 32 and to buff the severed end of the tape against the winding, as is shown in FIGURE 9. Meanwhile, air has been permitted to enter the retract side of the air cylinder 46, and exhausted from the drive side of that cylinder, retracting the knife blade 48. Air is then permitted into the retract side of the air cylinder 50 to retract the buffer 52, and, also, air is permitted to enter the retract side of the air cylinder 26 to retract the tape deck 28. The parts of the machine are then again in the position in which they are shown in FIGURE 6, ready to wrap tape around another winding on the stator after the stator has been repositioned on holding fixture 14.

As is evident from the above description of an embodiment of my invention, variations in the operation and various modifications in my machine can be envisioned. Such variations, embodying some or all of the novel features herein disclosed are comprehended, and I do not intend to be limited only to the specific embodiment herein described, but, rather, I intend to be limited only by my disclosure taken as a whole, including the appended claims.

I claim:

1. In a machine for attaching tape to an article, a tape needle including means for guiding said tape through a narrow opening and a buffer for movement against the back non-adhesive side of said tape and through said tape needle to move said tape out of said guiding means and against the surface of said article, to adhere the adhesive side of said tape to said article.

2. In a machine for attaching adhesive tape to an article, a tape needle containing means for guiding tape along said needle, means for moving said needle through a narrow opening adjacent to said article, a buffer for movement against the back non-adhesive side of said tape and through said tape needle after said needle has been moved through said narrow opening to move said tape out of said guiding means and against the surface of said article and to adhere the adhesive side of some of said tape to said article, and means for moving said needle back out of said narrow opening and along the surface of said article, to cause the adhesive side of additional quantities of said tape to become adhered to said article.

3. In a machine for attaching adhesive tape to an article, a tape needle containing means for guiding tape along said needle, means for moving said needle through a narrow opening adjacent to said article, a buffer for movement against the back non-adhesive side of said tape and through said tape needle after said needle has been moved through said narrow opening, to move said tape out of said guiding means and against the surface of said article and to adhere the adhesive side of some of said tape to said article, means for moving said needle back out of said narrow opening and along the surface of said article, to cause the adhesive side of additional quantities of said tape to become adhered to said article, and means for buffing said tape against said article.

4. A machine for attaching a length from a supply roll of adhesive tape to an article, said machine comprising a tape needle containing means for guiding the free end from said supply roll of tape along said needle, means for moving said needle through a narrow opening adjacent to said article, a buffer for movement against the back non-adhesive side of said end of tape and through said tape needle after said needle has been moved through said narrow opening to move said end of tape out of said guiding means and against the surface of said article and to adhere the adhesive side of said end of tape to said article, means for moving said needle back out of said narrow opening and along the surface of said article to cause the adhesive side of additional quantities of tape adjacent to said end of tape to become adhered to said article, means for severing said end of tape and tape adjacent to said end of tape from said supply roll and means for buffing said severed length of tape against said article.

5. A machine for attaching a length from a supply roll of adhesive tape around an article, said machine comprising a tape needle containing means for guiding the free end from said supply roll of tape along said needle, means for moving said needle through a narrow opening adjacent to said article, a buffer and means for moving said buffer against the back non-adhesive side of said end of tape and through said tape needle after said needle has been moved through said narrow opening to move said end of tape out of said guiding means and against the surface of said article and to adhere the adhesive side of said end of tape to said article, means for retracting said buffer away from said article and out of said needle, means for moving said needle back out of said narrow opening and around the surface of said article to cause the adhesive side of additional quantities of tape adjacent to said end of tape to become adhered to said article, means for severing said end of tape and tape adjacent to said end of tape from said supply roll and means for buffing the ends of said severed length of tape against said article.

6. A machine for attaching a length from a supply roll of adhesive tape around an article, said machine comprising a supporting structure, tape needle attached to said supporting structure and containing means for guiding the free end from said supply roll of tape along said needle, means for moving said needle through a narrow opening adjacent to said article, a buffer attached to said supporting structure and means for moving said buffer against the back non-adhesive side of said end of tape and through said tape needle after said needle has been moved through said narrow opening to move said end of tape out of said guiding means and against the surface of said article and to adhere the adhesive side of said end of tape to said article, means for retracting said buffer away from said article and out of said needle, means for moving said needle back out of said narrow opening and around the surface of said article to cause the adhesive side of additional quantities of tape adjacent to said end of tape to become adhered to said article, means for severing said end of tape and tape adjacent to said end of tape from said supply roll and means attached to said supporting structure for buffing the ends of said severed length of tape against said article.

References Cited

UNITED STATES PATENTS 1,380,531 6/1921 Cullin ------------- 156—468

DOUGLAS J. DRUMMOND, *Primary Examiner.*